United States Patent [19]
Gautier et al.

[11] Patent Number: 5,564,326
[45] Date of Patent: Oct. 15, 1996

[54] VALVE TYPE CONTROL DEVICE FOR A PNEUMATIC BOOSTER

[75] Inventors: Jean Pierre Gautier; Ulysse Verbo, both of Aulnay-sous-Bois; Miguel Perez Revilla, Argenteuil, all of France

[73] Assignee: Bendix Europe Services Techniques, Drancy, France

[21] Appl. No.: 90,062

[22] PCT Filed: Jun. 2, 1993

[86] PCT No.: PCT/FR93/00523

§ 371 Date: Aug. 6, 1993

§ 102(e) Date: Aug. 6, 1993

[87] PCT Pub. No.: WO94/00325

PCT Pub. Date: Jan. 6, 1994

[30] Foreign Application Priority Data

Jun. 25, 1992 [FR] France ................................ 92 07780

[51] Int. Cl.$^6$ .................................................. F15B 9/10
[52] U.S. Cl. ........................................ 91/369.2; 91/376 R
[58] Field of Search .............................. 91/369.2, 369.3, 91/376 R

[56] References Cited

U.S. PATENT DOCUMENTS

| 4,633,757 | 1/1987 | Kubota | 91/369.2 |
| 4,784,038 | 11/1988 | Gautier | 91/369.2 |
| 5,172,964 | 12/1992 | Levrai et al. | 91/376 R |

Primary Examiner—F. Daniel Lopez
Attorney, Agent, or Firm—Leo H. McCormick, Jr.

[57] ABSTRACT

This device comprises in a manner known per se a valve (7) cooperating with two valve seats (10b, 16a) to control the operation of the booster.

The second seat (16a) is formed on a sliding sleeve (16) in such a manner as to accelerate the admission of air and to shorten the response time of the booster.

3 Claims, 3 Drawing Sheets

VALVE TYPE CONTROL DEVICE FOR A PNEUMATIC BOOSTER

The present invention relates to a valve type control device for a pneumatic brake-booster.

The control rod which can be displaced, from a position of rest, in a first axial direction through the action of an input force. The rod being capped by a plunger which in turn has an axially support end face.

An annular valve surrounding the control rod, urged elastically in a first axial direction is actuated by the displacement of the control rod.

A first valve seat is formed by an annular portion of the plunger on the end opposite the support face.

A pneumatic piston located in the booster housing is movable in the first axial direction, from a position of rest, through the action of a pressure difference caused by actuation of the valve. The piston having an annular axial surface surrounding the plunger.

A reaction disk housed in a cup has a free face which engages an annular axial surface of the pneumatic piston. The support face of the plunger can apply combined forces developed through the movement of the plunger and piston for action on a push rod.

A second valve seat having an annular shape is concentric to and outside the first seat on the plunger. In the position of rest of the control rod, the second valve seat occupies a position further ahead than that of the first valve seat in the sense of the first axial direction. The valve engages the first seat in the position of rest and against the second seat on being actuated.

Devices of this kind are well known in the prior art, and one example thereof, among many others, is given in U.S. Pat. No. 4,491,058.

The conjoint utilization in motor vehicles of pneumatic brake-booster systems and electronic systems intended to prevent wheel locking has recently given rise to the to improve, by shortening it, the response time of such brake-booster systems so as to bring it closer to the very short response times in such electronic systems.

In this context the present invention has precisely the object of shortening the response time of a pneumatic brake-booster, i.e., the time between application of the brake by the driver of a vehicle and the occurrence of a brake-boosting force of significant amplitude.

According to the invention this object is achieved by a valve type control device for a booster essentially characterized by having a second seat of the valve is formed by an end face of a sleeve sealingly slidably mounted relative to a piston and configured to undergo, relative to a cup on an output rod, no movement in a sense of the first axial direction when the valve is actuated.

As a result of the structural relationship between the valve, sleeve and cup arrangement, the distance between the first and second valve seats on the actuation of the valve is increase and as a consequence a pressure difference generating the brake-boosting force is established more quickly in the booster.

In a first embodiment of the invention the sleeve forming the second valve seat bears against the cup, at least by means of an axial extension.

In a second possible embodiment of the invention the sleeve forming the second valve seat is disposed between the plunger and a movable wall formed by the piston. The sleeve has a second end face against which, on the actuation of the valve, the free face of the reaction disk comes to bear before coming into contact with the plunger. The sleeve as a result then under goes movement relative to the cup, in a second axial direction opposite to the first or actuation direction.

Other features and advantages of the invention will clearly emerge from the description thereof given below, with reference to the drawings.

DETAILED DESCRIPTION OF THE INVENTION

Figure 1:
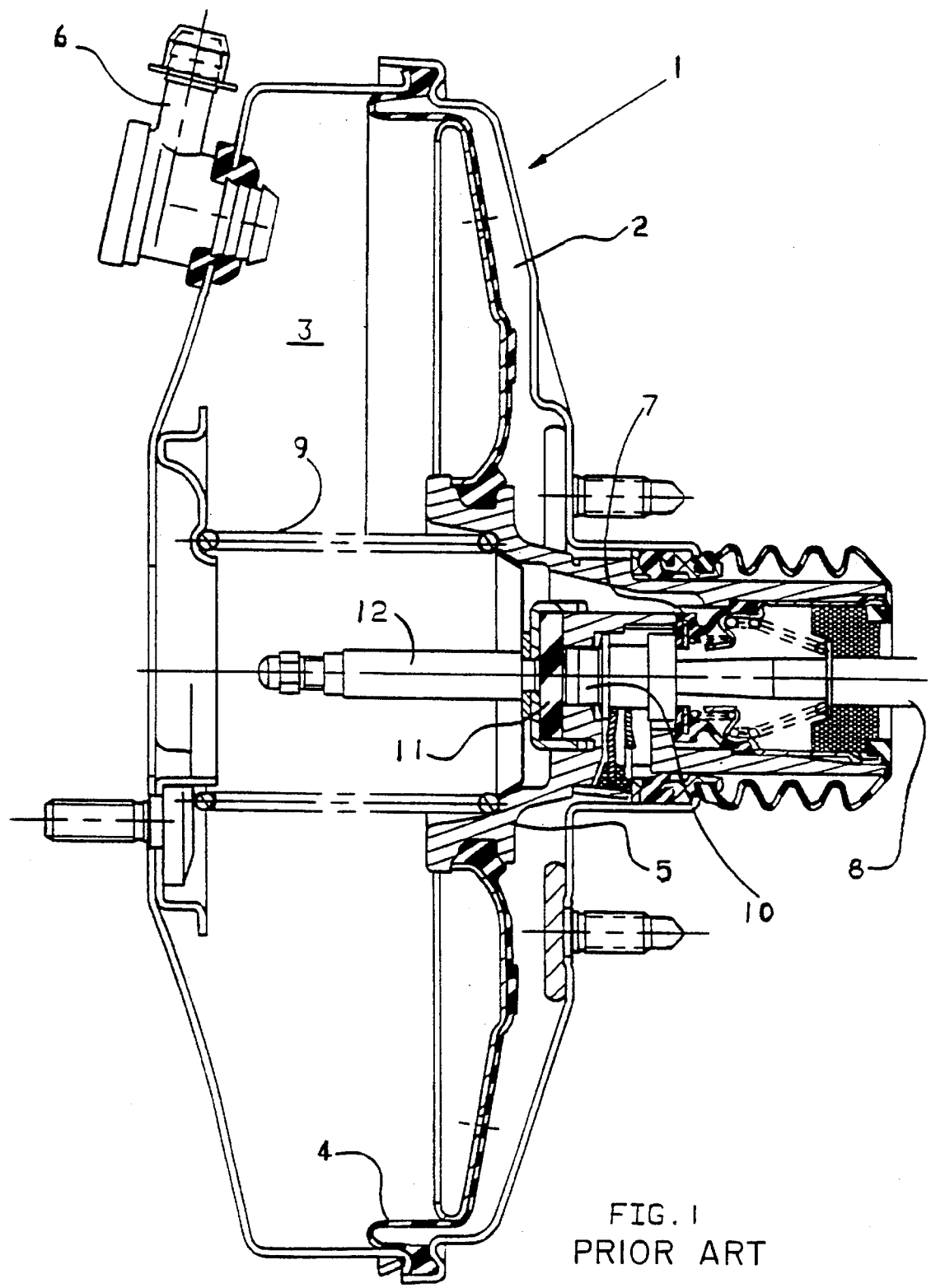
FIG. 1 is a view in section of a prior art pneumatic brake-booster which illustrates the operating principle of such brake boosters.

The invention relates to an improvement control valve for use in a pneumatic brake-boosters of the type shown in FIG. 1.

As the general design and the operation of such boosters are well known to those versed in the art, only sufficient details are presented to permit complete understanding of the improvement represented by the invention.

Schematically, a booster illustrated schematically in FIG. 1 comprises a rigid casing 1 divided, sealingly in operation, into a rear chamber 2 and a front chamber 3 by a diaphragm 4 fastened to a piston or walls which is movable inside the casing 2.

The front chamber 3, whose front face is sealingly closed during operation by mounting on a master cylinder (not shown), is permanently connected to a vacuum source (not shown) by way of a connector 6.

The pressure in the rear chamber 2 is controlled by a valve 7 responsive to a control rod 8, which is connected to the brake pedal.

When the control rod 8 is in the position of rest, in the present case pulled towards the right, the valve 7 establishes communication between the rear and front chambers 2 and 3 of the booster.

Since the rear chamber 3 is then subjected to the same vacuum as the front chamber 2, the piston or wall 5 is pushed or urged towards the right as shown in FIG. 1 into the position of rest, by a spring 9.

The movement of the control rod 8 towards the left has, in a first stage, the effect of moving the valve 7 to interrupt or isolate communication between the chambers 2 and 3 from one another, and then, in a second stage, on further movement of valve 7 opens communication between the rear chamber 3 and atmospheric pressure.

The pressure difference between the rear and front chambers, which then acts on the diaphragm 4, to exert a force on the piston or wall 5 a which after overcoming the force of spring 9 moves the wall to the left, as illustrated in FIG. 1, to develope a braking force.

The braking force exerted by the control rod 8 for action on the master cylinder via a plunger 10 and the brake-boosting force resulting from the thrust or output force developed on piston or wall 5 are applied against the upstream (right-hand) or rear face of a reaction disk 11, while the downstream (left-hand) or front face retransmits these forces to the push rod 12, whose function is the actuation of the master cylinder itself.

Figure 2:
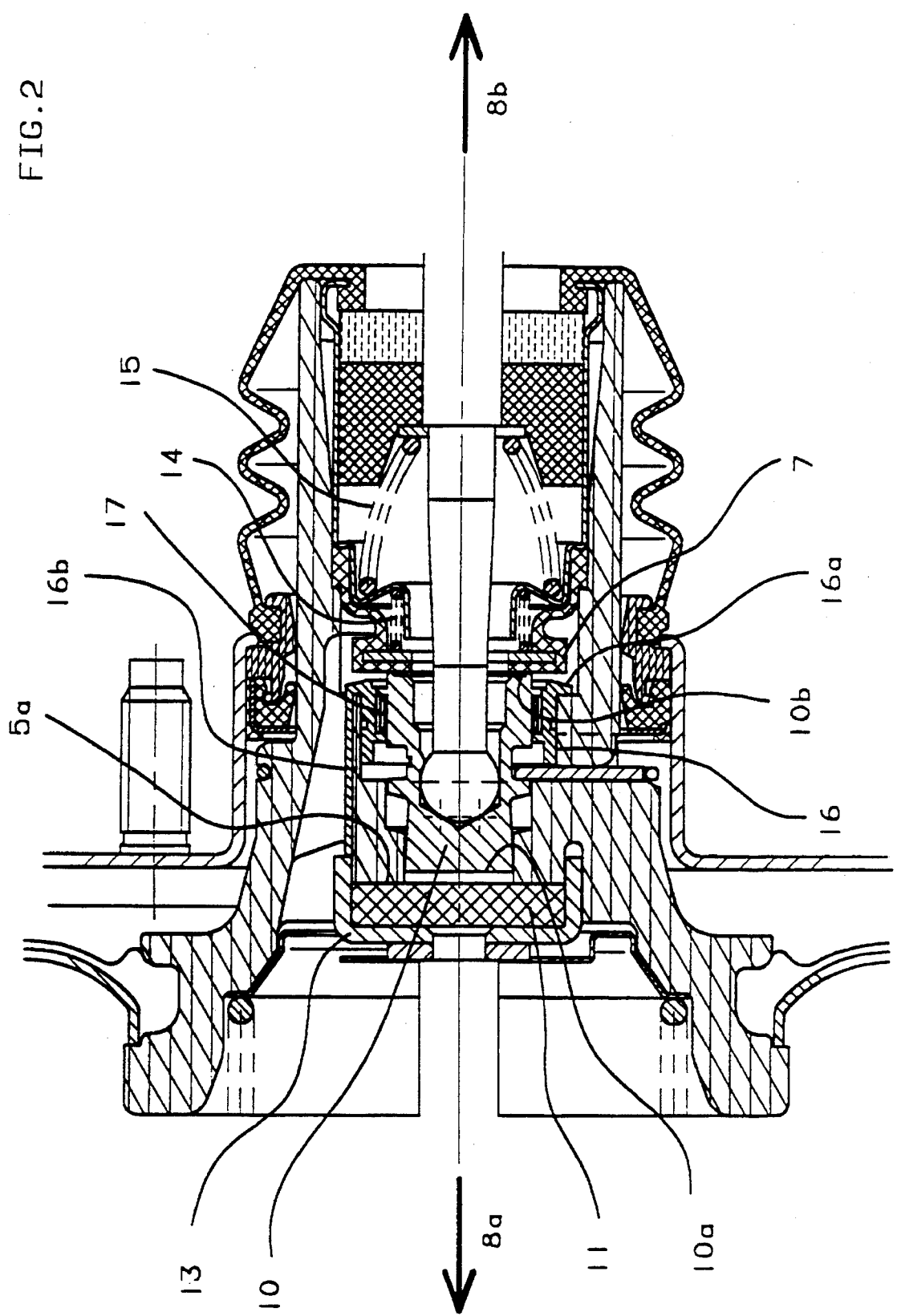
FIG. 2 is a partial sectional view of a booster, having a first control valve made according to the teachings of the invention.
Figure 3:
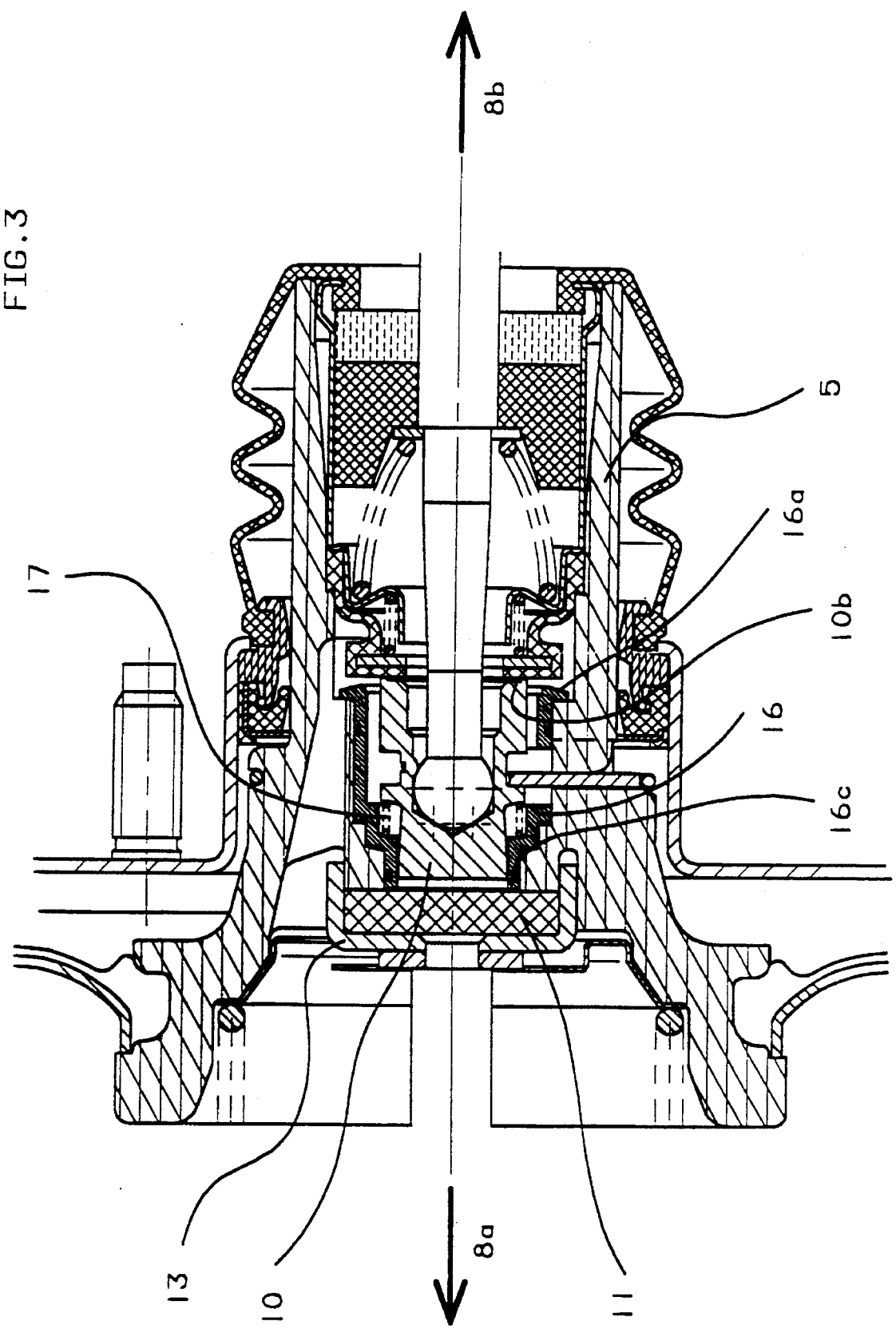
FIG. 3 is a similar view to that in FIG. 2 and relates to a second embodiment of the invention.

A full understanding of the invention now necessitates examination of FIGS. 2 and 3.

As these figures show, the reaction disk 11 is housed in a cup 13 capable of retransmitting to the push rod 12 the combined forces received by the reaction disk 11, these forces being applied by the support face 10a of the plunger 10 and by an annular axial bearing surface 5a on the piston or wall 5 surrounding the plunger 10.

The valve 7 is elastically urged in the axial operational direction 8a, that is to say towards the left and along the axis of the control rod 8, by a spring 14 and can cooperate with two valve seats 10b, 16a. The control rod 8 is in turn urged in the rest direction 8b by a return spring 15.

A first valve seat 10b is formed by an annular part of the plunger at the opposite end to the support face 10a, and the second valve seat 16a, which is likewise annular in shape, is concentric to and outside the first valve seat. In the position of rest of the control rod 8 illustrated in FIGS. 2 and 3, the second valve seat 16a occupies a position further ahead than that of the first valve seat 10b in the sense of the axial or actuation direction 8a.

As shown in FIGS. 2 and 3, the second seat 16a is formed by an end face of a sleeve 16 mounted in the piston or wall 5 and is designed to slide sealingly therein while moving in a direction 8b, opposite to the axial actuation direction 8a, relative to the plunger 10.

A spring 17 disposed between the plunger 10 and the sleeve 16 holds these two members apart and therefore urges the sleeve 16 towards the first axial actuation direction 8a.

In a first embodiment (FIG. 2), the sleeve 16 has an axial extension 16b which bears against the cup 13 to prevent movement of sleeve 16 in the first axial operational direction 8a relative to cup 15.

This arrangement prevents the axial distance between the first and second seats 10b, 16a from being shortened on actuation of the valve 7 and the movement of the piston 5 to the left as view in FIG. 2, during a brake application.

The sleeve 16 forms a solid connection and as a consequence that air is admitted more quickly into the rear chamber 2 to reduce the response time for the operation of the booster.

In the second embodiment of the invention, illustrated in FIG. 3, the sleeve 16 is slidably mounted between the plunger 10 and the piston or wall 5. Sleeve 16 and has a second end face 16c which directly bearing against the reaction disk 11.

As soon as the actuation of the valve 7 permits an increase of pressure in the rear chamber 2 and a pressure differential develops an output force across piston or wall 5 the annular surface 5a exerts on the reaction disk 11 a pressure directed in the first axial direction 8a.

This disk, which behaves like an incompressible fluid, is deformed by the swelling of its central portion in the second axial or rest direction 8b, thus pushing the sleeve 16 in said second direction.

As in the first embodiment, this arrangement thus makes it possible to accelerate the admission of air into the chamber 2 and therefore to shorten the response time of the booster.

We claim:

1. A control valve for a pneumatic brake-booster, comprising:

a control rod which can be displaced, from a position of rest, in a first axial direction through the action of an input force, said rod being capped by a plunger with a first end and a second end, said first end having an axially support face;

an annular valve surrounding the control rod, said valve being urged elastically towards in a first axial direction and being able to be actuated by the displacement of said control rod;

a first valve seat formed on an annular portion of said second end of said plunger;

a pneumatic piston movable in said first axial direction, from a position of rest, in response to a pressure difference caused by actuation of the valve, said piston having an annular surface surrounding the plunger;

a reaction disk housed in a cup and having a free face through which combined forces from said annular surface on said pneumatic piston and said support face of said plunger are communicated to a push rod; and a sleeve sealingly slidably mounted relative to the piston and configured to undergo, relative to the cup, no movement relative to said first axial direction when said valve is actuated, said sleeve having a first end face on which is formed a second valve seat having an annular shape which is concentric to and surrounding said first valve seat and said second valve seat in said position of rest of the control rod occupying a position ahead of said first valve seat relative to said first axial direction, said valve being urged toward engagement with said first valve seat in said position of rest and against said second seat on being actuated, characterised in that said sleeve is disposed between said plunger and said piston and has a second end face which, on actuation of said valve, engages said free face of the reaction disk prior to contacting said plunger, said sleeve undergoing movement relative to said cup in a second axial direction opposite to the first axial direction.

2. The control valve according to claim 1, wherein said sleeve bears against the cup through an axial extension.

3. The control valve according to claim 1, further including a spring for urging said sleeve in said first axial direction.

* * * * *